United States Patent
Ohashi et al.

(10) Patent No.: US 10,536,601 B2
(45) Date of Patent: Jan. 14, 2020

(54) INFORMATION PROCESSING DEVICE

(71) Applicant: KYOCERA Document Solutions Inc., Osaka (JP)

(72) Inventors: Akira Ohashi, Osaka (JP); Yusuke Okazaki, Osaka (JP); Yukihiro Shibata, Osaka (JP); Satoshi Sato, Osaka (JP); Yuki Yamamoto, Osaka (JP); Koji Tagaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/299,349

(22) Filed: Mar. 12, 2019

(65) Prior Publication Data
US 2019/0289155 A1  Sep. 19, 2019

(30) Foreign Application Priority Data
Mar. 14, 2018  (JP) .................. 2018-046682

(51) Int. Cl.
| | | |
|---|---|---|
| G06K 15/00 | (2006.01) | |
| H04N 1/00 | (2006.01) | |
| G06K 9/00 | (2006.01) | |
| G06F 3/12 | (2006.01) | |

(52) U.S. Cl.
CPC ..... *H04N 1/00896* (2013.01); *G06K 9/00369* (2013.01); *H04N 1/00891* (2013.01)

(58) Field of Classification Search
None
See application file for complete search history.

(56) References Cited

U.S. PATENT DOCUMENTS

| | | | |
|---|---|---|---|
| 10,015,343 B2 | 7/2018 | Kuroishi et al. | |
| 10,277,762 B2* | 4/2019 | Tsukui | H04N 1/00015 |
| 2012/0229831 A1 | 9/2012 | Kuroishi et al. | |
| 2014/0368856 A1* | 12/2014 | Yoon | H04N 1/00896 |
| | | | 358/1.13 |
| 2014/0376020 A1* | 12/2014 | Imamura | G03G 15/5004 |
| | | | 358/1.13 |
| 2016/0373601 A1 | 12/2016 | Kuroishi et al. | |

FOREIGN PATENT DOCUMENTS

JP  2012-186720 A  9/2012

* cited by examiner

*Primary Examiner* — Dov Popovici
(74) *Attorney, Agent, or Firm* — Studebaker & Brackett PC

(57) ABSTRACT

A controller of an information processing device changes a current state among standby states including a first standby state, a second standby state, and a third standby state, in which power consumption decreases in this order. When the non-operation duration runs for a first period, the controller changes the current state from the first standby state to the second standby state. When the non-operation duration subsequently runs for a second period, the controller changes the current state from the second standby state to the third standby state. When the sensor detects a detection target in the second standby state or the third standby state, the controller changes the current state to the first standby state. When the non-operation duration runs for a third period starting from state change, the controller changes the current state from the first standby state to the previous standby state.

5 Claims, 6 Drawing Sheets

INFORMATION PROCESSING DEVICE

INCORPORATION BY REFERENCE

The present application claims priority under 35 U.S.C. § 119 to Japanese Patent Application No. 2018-046682, filed on Mar. 14, 2018. The contents of this application are incorporated herein by reference in their entirety.

BACKGROUND

The present disclosure relates to an information processing device.

Information processing devices have been known that perform alternate transition between an electric power supply state and an electric power non-supply state in which power consumption differs from that in the electric power supply state. An information processing device such as above performs transition to the electric power non-supply state when a non-use state of an operation section of interest continues for a predetermined period or more. In another information processing device, timing of transition to the electric power non-supply state can be postponed upon a sensor detecting a human body in transition to the electric power non-supply state.

SUMMARY

An information processing device according to the present disclosure performs state change among a plurality of standby states different from one another in power consumption and operates accordingly. The information processing device includes a sensor, an input section, a timer, and a controller. The sensor detects a detection target present within a predefined area. The input section receives an instruction according to user operation. The timer measures non-operation duration that is a period during which no instruction is input. The controller changes a current state among the standby states based on the non-operation duration and a result of detection by the sensor. The standby states include a first standby state, a second standby state, and a third standby state. Power consumption in the second standby state is lower than that in the first standby state. Power consumption in the third standby state is lower than that in the second standby state. When the timer measures the non-operation duration in the first standby state running for a first period, the controller changes the current state from the first standby state to the second standby state. When the timer measures the non-operation duration in the second standby state subsequently running for a second period starting from state change to the second standby state, the controller changes the current state from the second standby state to the third standby state. When the sensor detects the detection target in one of the second standby state and the third standby state, the controller changes the current state from the one of the second standby state and the third standby state to the first standby state. When the timer measures the non-operation duration running for a third period starting from state change to the first standby state according to the result of detection by the sensor, the controller changes the current state from the first standby state to the one of the second standby state and the third standby state.

DETAILED DESCRIPTION

Figure 1:
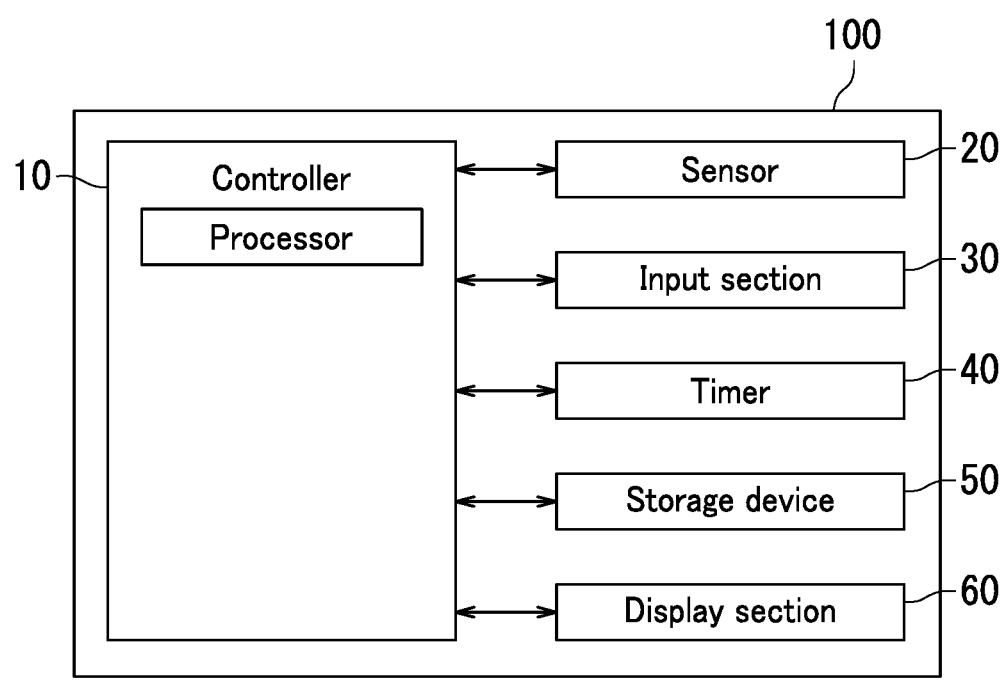
FIG. 1 is a configuration diagram illustrating an information processing device according to an embodiment of the present disclosure.

The following describes embodiments of the present disclosure with reference to the drawings. Note that elements that are the same or equivalent are indicated by the same reference signs in the drawings and description thereof is not repeated.

Figure 2:
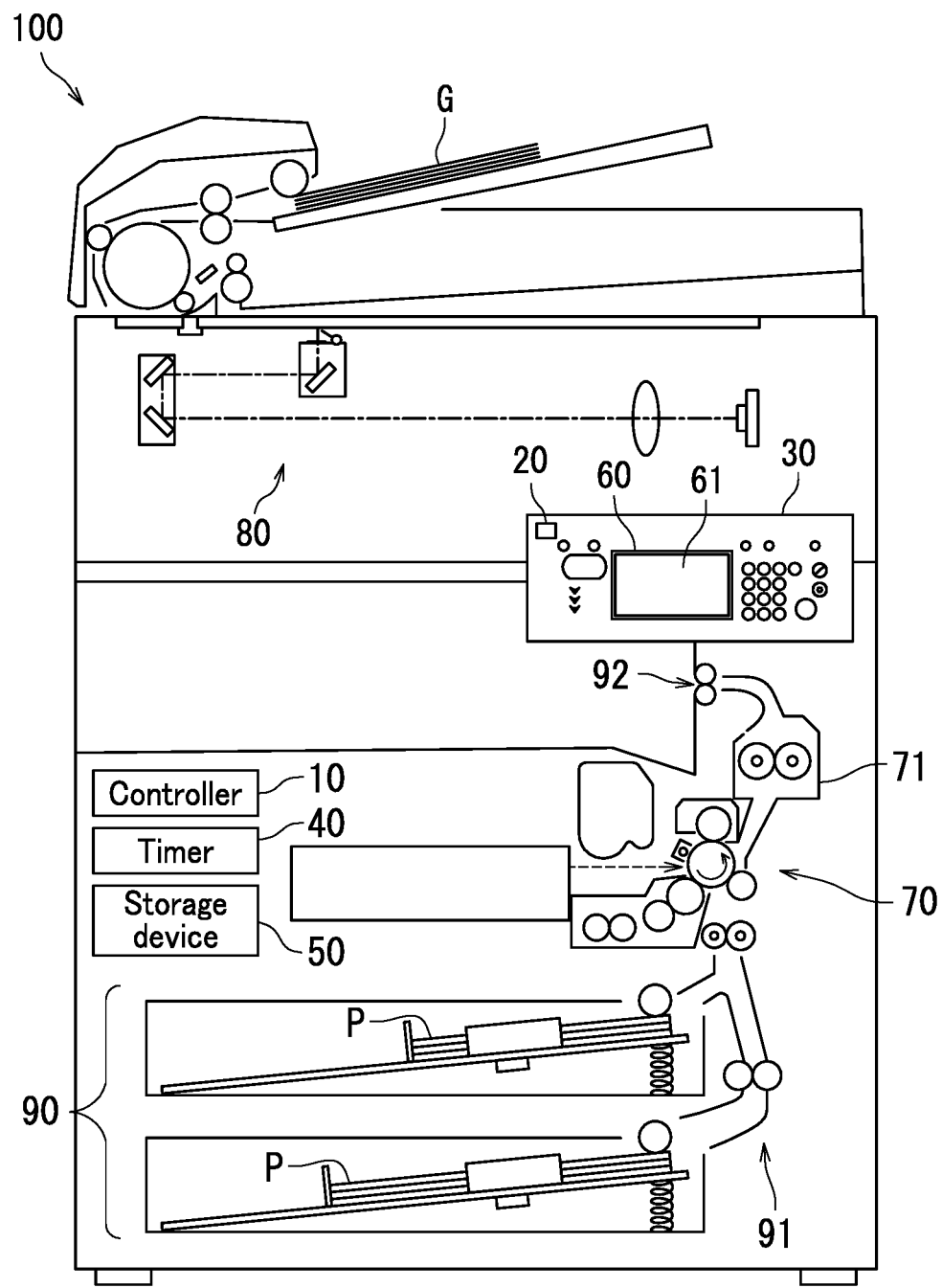
FIG. 2 is a diagram illustrating the information processing device according to the embodiment of the present disclosure.

The following describes a configuration of an information processing device 100 according to an embodiment of the present disclosure with reference to FIGS. 1 and 2. FIG. 1 is a configuration diagram illustrating the information processing device 100. FIG. 2 is a diagram illustrating the information processing device 100 according to an embodiment of the present disclosure. The information processing device 100 is for example an image forming apparatus or a personal computer. The following describes an embodiment where the information processing device 100 is an image forming apparatus. The image forming apparatus is for example a copier, a printer, a facsimile machine, or a multifunction peripheral having functions of them.

As illustrated in FIG. 1, the information processing device 100 includes a storage device 50, a controller 10, an input section 30, a sensor 20, a timer 40, and a display section 60.

The storage device 50 is constituted for example by a hard disk drive (HDD), random access memory (RAM), and read only memory (ROM). The storage device 50 stores therein various data, control programs, and application programs. The data includes for example image data, information on various time thresholds, and history information indicating a history of standby states. The control programs are programs for controlling operations of respective sections of the information processing device 100, and are executed by the controller 10.

The controller 10 is hardware circuitry including a power supply control module and a processor such as a central processing unit (CPU). The controller 10 controls the operations of the respective sections of the information processing device 100 through the processor reading out and executing the control programs stored in the storage device 50. The processor also reads out and executes the application programs stored in the storage device 50. The power supply control module controls supply of electric power necessary for the operations of the respective sections. Furthermore, the controller 10 receives a signal indicating a result of detection (also referred to below as a "sensor signal") from the sensor 20. The controller 10 also receives a signal indicating a result of measurement (also referred to below as a "timer signal") from the timer 40.

The input section 30 receives various instructions according to user operations. Specifically, the input section 30 is for example an operation panel having a touch panel function and including various hardware buttons. Examples of the various instructions include a document reading instruction, a copying and printing instruction, and various setting instructions. The document reading instruction is an instruction to read an image of a document. The copying and printing instruction is an instruction to copy and print a document. The various setting instructions are instructions to change various settings for the information processing device 100. Examples of the various settings include a setting of a threshold value of a period for changing a standby state of the information processing device 100.

The sensor 20 detects a detection target present within a predefined area. Specifically, the sensor 20 is a motion sensor such as a reflective sensor. The detection target is for example a human body. The sensor 20 is for example disposed on the operation panel. The sensor 20 includes a light emitting section and a light receiving section. The sensor 20 detects the detection target by emitting infrared rays from the light emitting section and receiving by the light receiving section infrared rays reflected by the detection target. The sensor 20 detects the presence of the detection target within the predefined area, and outputs the sensor signal to the controller 10. When the detection target moves away from the information processing device 100, the sensor 20 detects no presence of a detection target within the predefined area. In the above configuration, whether or not a user or a passerby is present around the information processing device 100 can be easily determined. Note that the sensor 20 may be a sensor that detects visible light or ultrasonic waves.

The timer 40 measures a length of non-operation duration. The non-operation duration is a period during which no instruction is input to the input section 30. The timer 40 is for example a timer circuit. The timer 40 outputs a signal indicating the result of measurement to the controller 10.

The display section 60 is for example a display having a touch panel function, and is disposed on the operation panel. The display section 60 such as above also serves as the input section 30. The display is for example a liquid-crystal display or an organic electroluminescent (EL) display.

The information processing device 10) performs state change among a plurality of standby states and operates accordingly. The standby states differ from one another in power consumption. Specifically, the controller 10 performs state change among the standby states based on the non-operation duration and the result of detection by the sensor 20. That is, the controller 10 performs state change among the standby states of the information processing device 100 through control of the operations of the respective sections of the information processing device 100. Note that details of the standby states will be described later with reference to FIGS. 3A and 3B.

As illustrated in FIG. 2, the information processing device 100 may further include an image forming section 70, a reading section 80, a feeding section 90, a conveyance section 91, and an ejection section 92 in addition to the storage device 50, the controller 10, the input section 30, the sensor 20, the timer 40, and the display section 60, which are described with reference to FIG. 1.

The display section 60 includes a screen 61 that displays a screen image. The screen image is an image used for inputting various instructions, and includes a message image, a software button image, and an icon image. The controller 10 can control the display section 60 to change an on/off state of the screen 61.

The reading section 80 reads an image of a document G according to a document reading instruction input to the input section 30. The reading section 80 generates image data from the read image. The feeding section 90 accommodates a plurality of sheets P. and feeds the sheets P one at a time to the conveyance section 91. The sheets P are for example paper sheets or synthetic resin sheets. The conveyance section 91 includes a plurality of conveyance rollers to convey the sheets P to the image forming section 70.

The image forming section 70 forms a print image (for example, the image of the document G) on a sheet P by electrography, and fixes the print image to the sheet P through application of heat and pressure. Specifically, the image forming section 70 includes a photosensitive drum, a charger, a light exposure device, a development device, a replenishment device, a transfer device, a cleaner, a static eliminator, and a fixing device 71. The fixing device 71 melts unfixed toner (toner image representing the print image) by applying heat and pressure to the sheet P to fix the toner to the sheet P. The controller 10 can for example control the image forming section 70 to change the temperature in the fixing device 71.

The conveyance section 91 conveys to the ejection section 92 the sheet P to which the print image has been fixed. The ejection section 92 ejects the sheet P out of the information processing device 100.

Figure 3A:
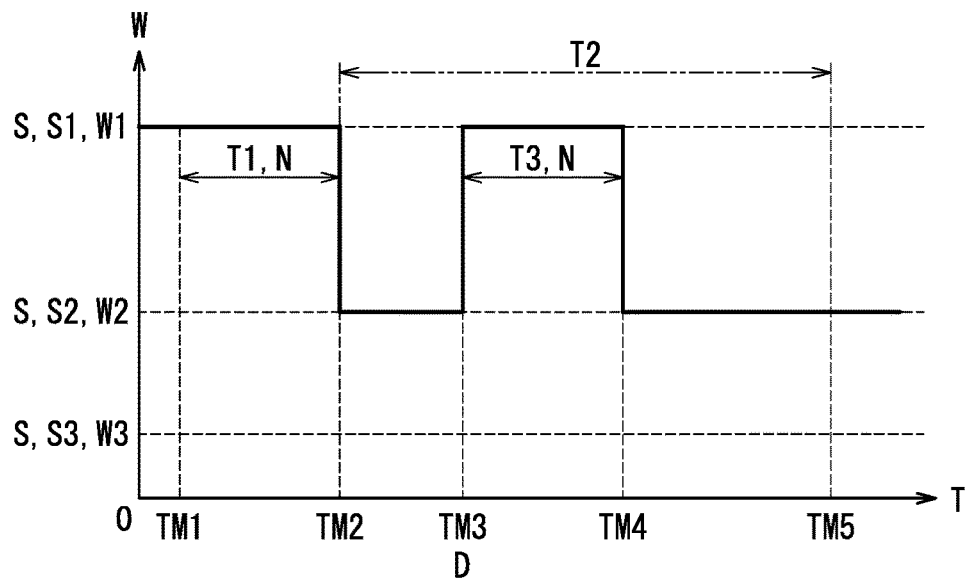
FIGS. 3A and 3B each are a timing diagram illustrating state change among a plurality of standby states.
Figure 3B:
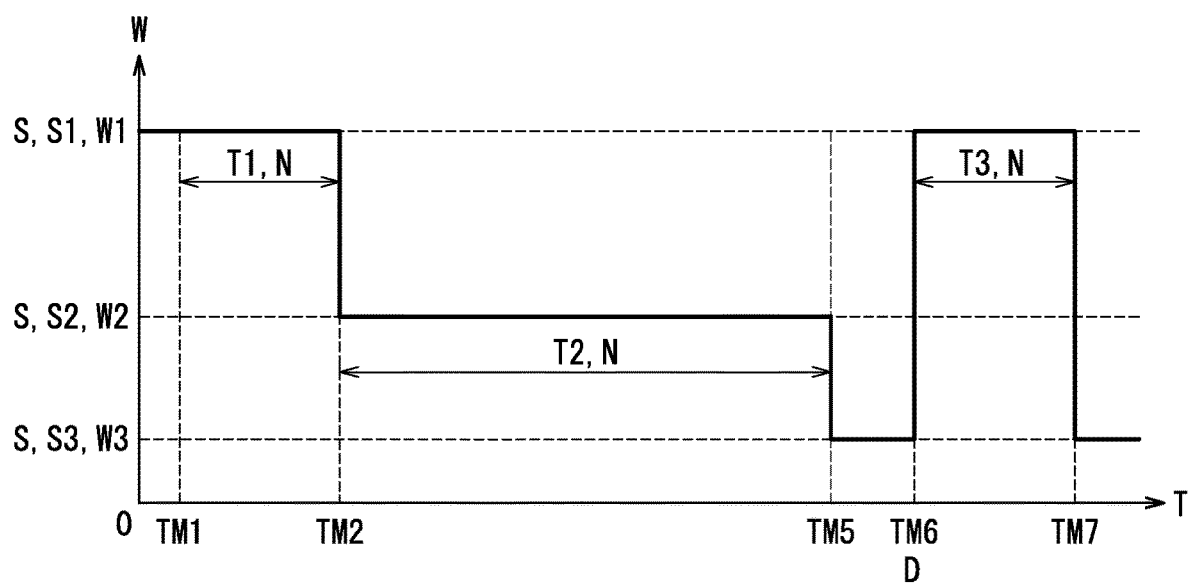

The following describes the configuration of the information processing device 100 and the standby states S in detail with reference to FIGS. 3A and 3B in addition to FIGS. 1 and 2. FIGS. 3A and 3B each are a timing diagram illustrating state change among the standby states S in the information processing device 100.

The standby states S include a first standby state S1, a second standby state S2, and a third standby state S3. FIG. 3A illustrates a situation in which the controller 10 changes a current state from the second standby state S2 (time TM2 to time TM3) to the first standby state S1 according to a sensor signal D. FIG. 3B illustrates a situation in which the controller 10 changes the current state from the third standby state S3 (time TM5 to time TM6) to the first standby state S1 according to the sensor signal D.

The first standby state S1 is for example a state in which a power consumption W is at a normal value (also referred to below as a "normal state"). The power consumption W in the first standby state S1 is for example represented by a power consumption W1. The normal state is for example a ready state. The ready state is a state in which the image forming section 70 is ready to form a print image on a sheet P within a minimum waiting period. The minimum waiting period is a period shorter than both a waiting period in the second standby state S2 and a waiting period in the third standby state S3. That is, when any of the various printing instructions (e.g., a copying and printing instruction or an instruction to print status of the information processing device 100) is input to the input section 30 in the ready state, the image forming section 70 forms a print image on a sheet P within a shorter period than any of the standby states S other than the ready, state.

The second standby state S2 is a state in which the power consumption W is lower than that in the first standby state S1. Specifically, the power consumption W in the second standby state S2 is for example represented by a power consumption W2. In an embodiment in which the first standby state S1 is the normal state, the second standby state S2 is a power saving state in which the power consumption W is lower than that in the normal state. In the power saving state, the power source module reduces an amount of electric power supplied to sections of the information processing device 100 to be less than that in the normal state. The low power consumption state is an example of the power saving state, and includes a state in which the screen 61 of the display section 60 is turned off. The state in which the screen 61 of the display section 60 is turned off is for example a state in which a backlight of a liquid-crystal display serving as the display of the display section 60 is turned off.

The third standby state S3 is a state in which the power consumption W is lower than that in the second standby state S2. Specifically, the power consumption W in the third standby state S3 is for example represented by a power consumption W3. The third standby state S3 is for example a sleep state. The sleep state is an example of the power saving state, and includes a state in which the display section 60 is turned off and a state in which the temperature of the image forming section 70 is reduced. The state in which the temperature of the image forming section 70 is reduced is for example a state in which the temperature in the fixing device 71 is further reduced to be lower than that in the first standby state S and that in the second standby state S2.

As illustrated in FIG. 3A, when the timer 40 measures non-operation duration N in the first standby state S1 running for a first period T1, the controller 10 changes the current state from the first standby state S1 to the second standby state S2. Specifically, the first period T1 is a period T from time TM1 to time TM2. The first period T1 is for example three minutes. When the timer 40 measures the non-operation duration N running for the first period T1, the timer 40 outputs the timer signal to the controller 10. In response to the timer signal, the controller 10 changes the current state from the first standby state S1 to the second standby state S2.

Furthermore, as illustrated in FIG. 3B, when the timer 40 measures the non-operation duration N in the second standby state S2 subsequently running for a second period T2 starting from the time TM2 of state change to the second standby state S2, the controller 10 changes the current state from the second standby state S2 to the third standby state S3. Specifically, the second period T2 is a period T from the time TM2 to time TM5. When the timer 40 measures the non-operation duration N running for the second period T2, the timer 40 outputs the timer signal to the controller 10. In response to the timer signal, the controller 10 changes the current state from the second standby state S2 to the third standby state S3.

Note that the first period T1 and the second period T2 may each be set in the information processing device 100 according to user operation or preset as a default setting. In a situation in which priority is assigned to shortening of time for reversion to the normal state (for example, in a situation in which the low power consumption state has a higher priority than the sleep state), it is only required to change a setting so as to lengthen the second period T2 using the input section 30. The second period T2 in such a case is for example 240 minutes. In a situation in which priority is assigned to reduction in power consumption W of the information processing device 100 (for example, in a situation in which the sleep state has a high priority), it is only required to change the setting so as to shorten the second period T2 using the input section 30.

The second period T2 in such a case is for example three minutes. Upon the sensor 20 detecting the detection target in either the second standby state S2 or the third standby state S3, the controller 10 changes the current state to the first standby state S1. Specifically, the sensor 20 outputs the sensor signal D to the controller 10. In response to the sensor signal D, the controller 10 changes the current state to the first standby state S1. The storage device 50 stores the history information indicating a standby state S directly before state change to the first standby state S1 (also referred to below as a "previous standby state S" or a "previous power saving state").

For example, upon receiving the sensor signal D at time TM3 in the second standby state S2, the controller 10 changes the current state from the second standby state S2 to the first standby state S1 as illustrated in FIG. 3A. By contrast, for example, upon receiving the sensor signal D at time TM6 in the third standby state S3, the controller 10 changes the current state from the third standby state S3 to the first standby state S1 as illustrated in FIG. 3B.

When the timer 40 measures the non-operation duration N running for a third period T3 starting from state change to the first standby state S1 according to the result of detection by the sensor 20, the controller 10 changes the current state from the first standby state S1 to the previous standby state S. Specifically, when non-period duration N runs for the third period T3 (for example, three minutes) after state change to the first standby state S1 in response to the sensor signal D, the controller 10 receives the timer signal from the timer 40. The controller 10 changes the current state from the first standby state S1 to the previous standby state S among the standby states S based on the timer signal and the history information. In the above configuration, state change to a desired power saving state that had been maintained before state change, rather than to a power saving state preset as a default setting can be easily done according to measurement of the non-operation duration N.

For example, as illustrated in FIG. 3A, when the non-operation duration N runs until time TM4 from the time TM3 of state change to the first standby state S1 in response to the sensor signal D, the controller 10 changes the current state from the first standby state S1 to the second standby state S2 that is the previous standby state S. Also, as illustrated in FIG. 3B, for example, when the non-operation duration N runs until time TM7 from the time TM6 of state change to the first standby state S1 in response to the sensor signal D, the controller 10 changes the current state from the first standby state S1 to the third standby state S3 that is the previous standby state S.

Note that the third period T3 is preferably preset to be short as a default setting. For example, when the non-operation duration N runs from state change to the first standby state S1 in response to the sensor signal D even in a situation in which the third period T3 is equal to or longer than the first period T1, the controller 10 gives priority to continuation of the non-operation duration N for the third period T3 over continuation of the non-operation duration N for the first period T1. That is, the controller 10 disregards elapsing of the first period T1 and performs state change to the previous standby state S when the third period T3 elapses.

As described with reference to FIGS. 1 to 3B, the information processing device 100 according to the present embodiment performs state change among the standby states S different in power consumption W and operates accordingly. When the non-operation duration N in the first standby state S1 runs for the first period T1, the controller 10 changes the current state from the first standby state S1 to the second standby state S2. When the non-operation duration N in the second standby state S2 subsequently runs for the second period T2 starting from the time TM2 of state change to the second standby state S2, the controller 10 changes the current state from the second standby state S2 to the third standby state S3. Upon the sensor 20 detecting the detection target in either the second standby state S2 or the third standby state S3, the controller 10 changes the current state to the first standby state S1. When the non-operation duration N runs for the third period T3 starting from state change to the first standby state S1 according to the result of detection by the sensor 20, the controller 10 changes the current state from the first standby state S1 to the previous standby state S. Thus, when a certain period of time elapses after state change to the first standby state S1 due to detection of a passerby, the controller 10 can return the current state to the previous power saving state. In the above configuration, even after unintentional state change to the first standby state S1 by the user, the current state can be directly returned to a desired power saving state that had been maintained before the state change without changing to another power saving state. As a result, efficiency in maintenance of a desired power saving mode can be improved.

It is preferable that the information processing device 100 according to the present embodiment additionally include the display section 60 and the image forming section 70. The first standby state S1, the second standby state S2, and the third standby state S3 may be the ready state, the low power consumption state, and the sleep state, respectively. The ready state is a state in which the image forming section 70 is ready to form a print image within the minimum waiting period. The low power consumption state includes a state in which the display section 60 is turned off. The sleep state includes the state in which the display section 60 is turned off and a state in which the temperature of the image forming section 70 is reduced. As such, the current state can be efficiently returned from the normal state in which the power consumption W is comparatively large to a desired power saving state.

Figure 4A:
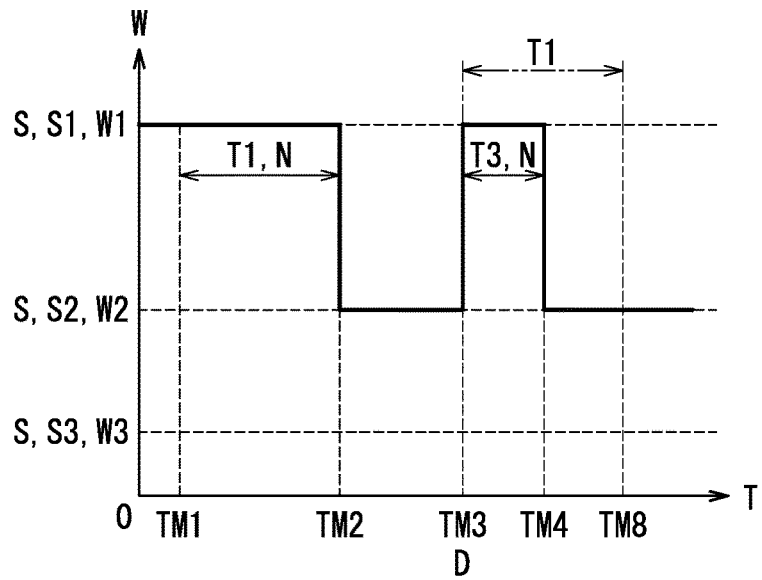
FIGS. 4A and 4B each are a timing diagram illustrating state change among the standby states.
Figure 4B:
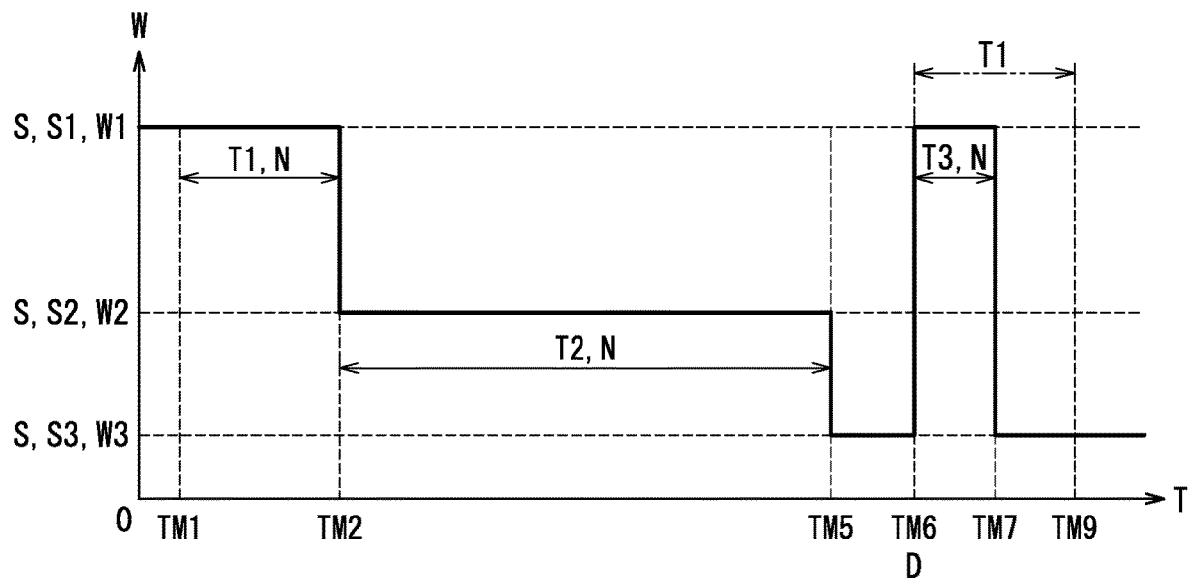

Moreover, as illustrated in FIGS. 4A and 4B, the third period T3 is preferably shorter than the first period T1. FIGS. 4A and 4B each are a timing diagram illustrating state change among the standby states S. Similarly to the state change described with reference to FIG. 3A, FIG. 4A illustrates a situation in which the controller 10 changes the current state from the second standby state S2 (time TM2 to time TM3) to the first standby state S1 in response to the sensor signal D. Similarly to the state change described with reference to FIG. 3B, FIG. 4B illustrates a situation in which the controller 10 changes the current state from the third standby state S3 (time TM5 to time TM6) to the first standby state S1 in response to the sensor signal D.

For example, the first period T1 and the third period T3 are three minutes and one minute, respectively. When the non-operation duration N runs for the third period T3 starting from state change to the first standby state S according to the result of detection by the sensor 20 (time TM3 in FIG. 4A or time TM6 in FIG. 4B), the controller 10 changes the current state from the first standby state S1 to the previous standby state S within a time period shorter than the first period T1 (TM3 to TM8 in FIG. 4A or TM6 to TM9 in FIG. 4B). Thus, the information processing device 100 can be reverted to the previous standby state S which is a desired power saving state. Consequently, the power consumption W of the information processing device 100 can be reduced and convenience of the user using the information processing device 100 can be increased.

Figure 5A:
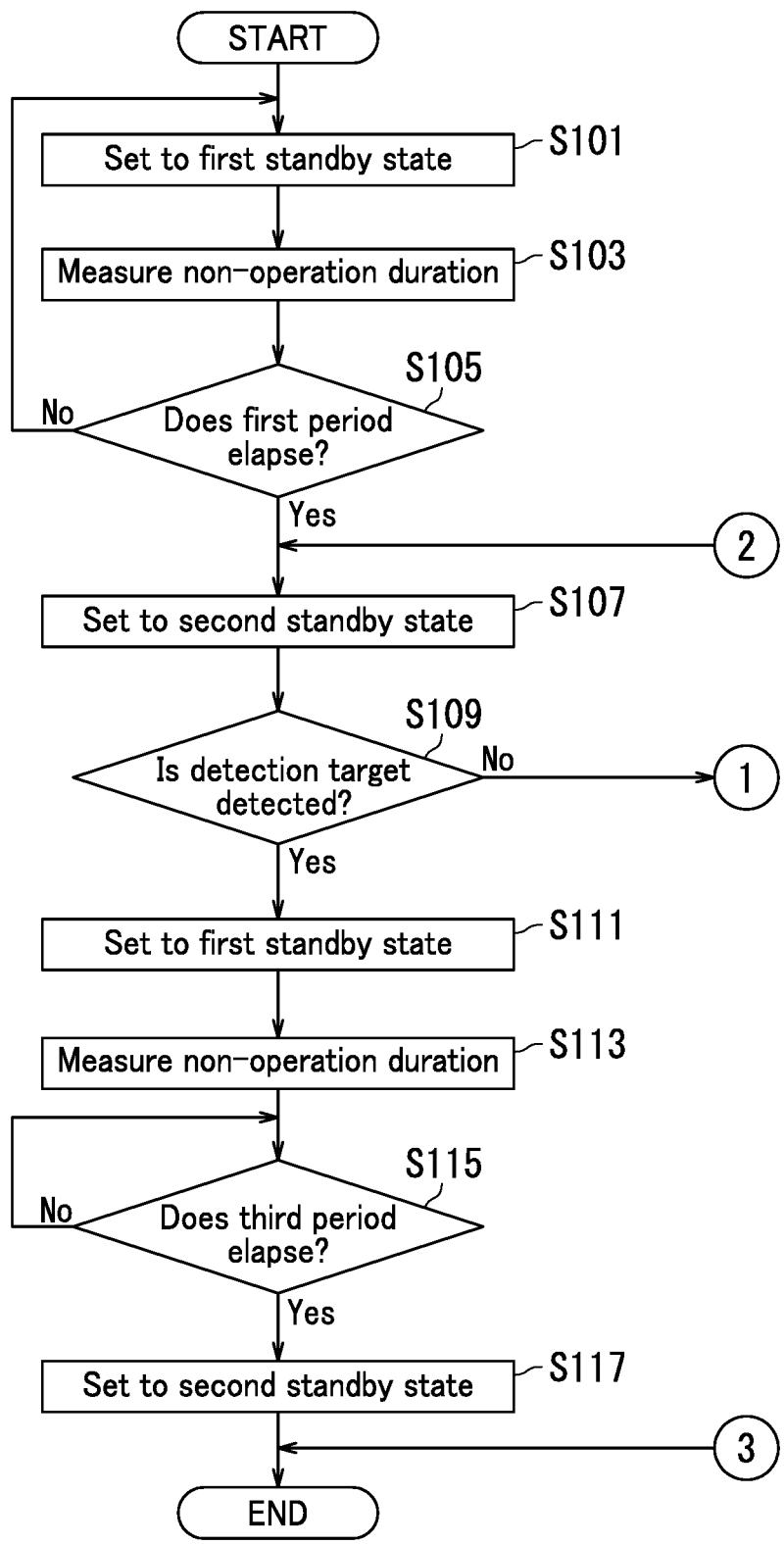
FIGS. 5A and 5B each are a flowchart depicting state change among the standby states.
Figure 5B:
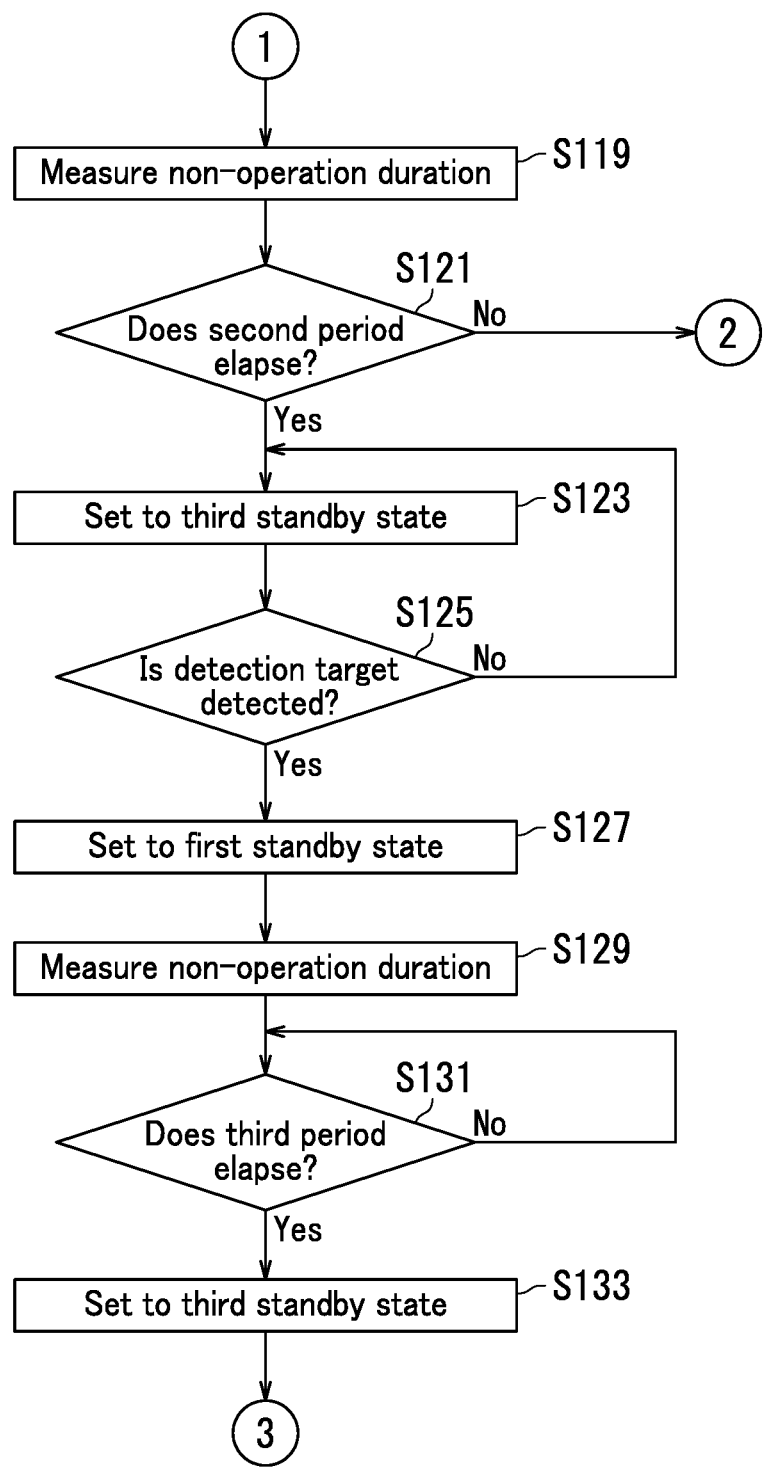

Operation of the information processing device 100 will be described next with reference to FIGS. 1 to 5B. FIGS. 5A and 5B each are a flowchart illustrating state change among the standby states S. Through execution of Step S101 to Step S133, the information processing device 100 performs state change among the standby states S. Specific operation is as follows.

In Step S101 in FIG. 5A, the controller 10 sets the information processing device 100 to the first standby state S1. The processing proceeds to Step S103.

Next in Step S103, the timer 40 measures the non-operation duration N in the first standby state S1. The timer 40 outputs the timer signal to the controller 10. The processing proceeds to Step S105.

Subsequently, the controller 10 determines based on the timer signal whether or not the non-operation duration N runs for the first period T1 in Step S105. Upon the non-operation duration N running for the first period T1 (Yes in Step S105), the processing proceeds to Step S107. By contrast, upon the non-operation duration N not running for the first period T1 (No in Step S105), the processing returns to Step S101 and the controller 10 maintains the first standby state S1.

When a positive determination is made in Step S105, the controller 10 sets the information processing device 100 to the second standby state S2 in Step S107. That is, the controller 10 changes the current state from the first standby state S1 to the second standby state S2. The processing proceeds to Step S109.

Next in Step S109, the controller 10 determines whether or not any detection targets are detected according to the sensor signal D. When a detection target is detected (Yes in Step S109), the processing proceeds to Step S111. By contrast, when no detection target is detected (No in Step S109), the processing proceeds to Step S119 in FIG. 5B.

When a positive determination is made in Step S109, the controller 10 sets the information processing device 100 to the first standby state S1 in Step S111. That is, the controller 10 changes the current state from the second standby state S2 to the first standby state S1. The processing proceeds to Step S113.

Then in Step S113, the timer 40 measures the non-operation duration N in the first standby state S1. The timer 40 outputs the timer signal to the controller 10. The processing proceeds to Step S115.

Next in Step S115, the controller 10 determines whether or not the non-operation duration N runs for the third period T3 based on the timer signal. When the non-operation duration N runs for the third period T3 (Yes in Step S115), the processing proceeds to Step S117. By contrast, when the non-operation duration N does not run for the third period T3 (No in Step S115), the controller 10 repeats Step S115 until the non-operation duration N runs for the third period T3.

When a positive determination is made in Step S115, the controller 10 sets the information processing device 100 to the second standby state S2 in Step S117. That is, the controller 10 changes the current state from the first standby state S1 to the second standby state S2. The processing ends then.

When a negative determination is made in Step S109, the timer 40 measures the non-operation duration N in the second standby state S2 in Step S119 in FIG. 5B.

The timer 40 outputs the timer signal to the controller 10. The processing then proceeds to Step S121.

Next in Step S121, the controller 10 determines whether or not the non-operation duration N runs for the second period T2 based on the timer signal. When the non-operation duration N runs for the second period T2 (Yes in Step S121), the processing proceeds to Step S123. By contrast, when the non-operation duration N does not run for the second period T2 (No in Step S121), the processing returns to Step S107 in FIG. 5A and the controller 10 maintains the second standby state S2.

When a positive determination is made in Step S121, the controller 10 sets the information processing device 100 to the third standby state S3 in Step S123. That is, the controller 10 changes the current state from the second standby state S2 to the third standby state S3. The processing proceeds to Step S125.

Next in Step S125, the controller 10 determines whether or not any detection targets are detected according to the sensor signal D. When any detection target is detected (Yes in Step S125), the processing proceeds to Step S127. By contrast, when no detection target is detected (No in Step S125), the processing returns to Step S123 and the controller 10 maintains the third standby state S3.

When a positive determination is made in Step S125, the controller 10 sets the information processing device 100 to the first standby state S in Step S127. That is, the controller 10 changes the current state from the third standby state S3 to the first standby state S1. The processing proceeds to Step S129.

Then in Step S129, the timer 40 measures the non-operation duration N in the first standby state S1. The timer 40 outputs the timer signal to the controller 10. The processing proceeds to Step S131.

Next in Step S131, the controller 10 determines whether or not the non-operation duration N runs for the third period T3 based on the timer signal. When the non-operation duration N runs for the third period T3 (Yes in Step S131), the processing proceeds to Step S133. By contrast, when the non-operation duration N does not run for the third period T3 (No in Step S131), the controller 10 repeats Step S131 until the non-operation duration N runs for the third period T3.

When a positive determination is made in Step S131, the controller 10 sets the information processing device 100 to the third standby state S3 in Step S133. That is, the controller 10 changes the current state from the first standby state S1 to the third standby state S3. Then, the processing ends as illustrated in FIG. 5A.

The embodiments of the present disclosure have been described so far with reference to the drawings (FIGS. 1 to 5B). However, the present invention is not limited to the above embodiments, and may be implemented in various different forms that do not deviate from the essence of the present disclosure. Elements of configuration disclosed in the above embodiments can be combined as appropriate to form various disclosures. For example, some of the elements of configuration in the embodiments may be omitted. Furthermore, elements of configuration in different embodiments may be combined as appropriate. The drawings schematically illustrate elements of configuration in order to facilitate understanding and properties of elements of configuration illustrated in the drawings, such as an amount of the power consumption, and a length, number, and interval of the periods, may differ from actual properties thereof in order to facilitate preparation of the drawings. Furthermore, properties of elements of configuration described in the above embodiments, such as periods and shapes and dimensions of the elements of configuration, are merely examples and are not intended as specific limitations. Various alterations may be made so long as there is no substantial deviation from the configuration of the present disclosure.

(1) The sensor 20 described with reference to FIGS. 1 and 2 is a reflective sensor, but the present disclosure is not limited thereto. The sensor 20 may be for example a pyroelectric sensor or a camera. The pyroelectric sensor detects change in heat (amount of infrared rays) caused due to movement of a human body. The camera includes an image sensor such as a charge-coupled device (CCD) image sensor or a complementary metal-oxide-semiconductor (CMOS) image sensor.

(2) The input section 30 described with reference to FIGS. 1 to 5B is an operation panel, but the present disclosure is not limited thereto. It is only required that the input section 30 be capable of receiving instructions to operate the respective sections of the information processing device 100. In an embodiment in which the information processing device 100 further includes a communication section, an instruction may be input to the communication section from an external device. In such an embodiment, the communication section corresponds to an example of the input section 30. The communication section is connected to various external devices via a network to enable wire or wireless communication with the external devices, and transmits and receives various signals and data to and from the external devices. Examples of the instruction include a print job to cause the information processing device 100 to execute printing.

(3) The first standby state S1 described with reference to FIGS. 1 to 5B is the normal state (for example, the ready state), but the present disclosure is not limited thereto. It is only required that the first standby state S1 be a standby state S in which the power consumption W is higher than that in the second standby state S2 and the third standby state S3. The first standby state S1 may be for example a power saving state different from the second and third standby states S2 and S3. The power saving state is not limited to the low power consumption state and the sleep state, and may be another standby state S.

(4) The information processing device 100 described with reference to FIG. 2 is an electrographic multifunction peripheral, but the present disclosure is not limited thereto. It is only required that the information processing device 100 be capable of forming a print image on a sheet P in an embodiment in which the information processing device 100 is an image forming apparatus. The information processing device 100 may be for example an inkjet recording printer. In a situation for example in which the information processing device 100 is an inkjet recording printer, the image forming section 70 may include a recording head.

What is claimed is:

1. An information processing device that performs state change among a plurality of standby states different from one another in power consumption and operates accordingly, comprising:
　a sensor configured to detect a detection target present within a predefined area;
　an input section configured to receive an instruction according to user operation;
　a timer configured to measure non-operation duration, the non-operation duration being a period during which no instruction is input; and
　a controller configured to change a current state among the standby states based on the non-operation duration and a result of detection by the sensor, wherein
　the standby states include a first standby state, a second standby state, and a third standby state, power consumption in the second standby state being lower than that in the first standby state, and power consumption in the third standby state being lower than that in the second standby state, and
　the controller
　　changes the current state from the first standby state to the second standby state when the timer measures the non-operation duration in the first standby state running for a first period,
　　changes the current state from the second standby state to the third standby state when the timer measures the non-operation duration in the second standby state subsequently running for a second period starting from state change to the second standby state, changes the current state from either one of the second standby state and the third standby state to the first standby state when the sensor detects the detection target in the one of the second standby state and the third standby state, and changes the current state from the first standby state to the one of the second standby state and the third standby state when the timer measures the non-operation duration running for a third period starting from state change to the first standby state according to the result of detection by the sensor.

2. The information processing device according to claim 1, wherein the third period is shorter than the first period.

3. The information processing device according to claim 1, further comprising:

a display section including a screen that displays a screen image; and an image forming section configured to form a print image on a sheet, wherein the first standby state is a ready state in which the image forming section is ready to form the print image within a minimum waiting period, the minimum waiting period is a waiting period shorter than both a waiting period in the second standby state and a waiting period in the third standby state, the second standby state is a low power consumption state including a state in which the screen is turned off, and the third standby state is a sleep state including the state in which the screen is turned off and a state in which temperature of the image forming section is reduced.

4. The information processing device according to claim 1, wherein the input section includes an operation panel, the sensor is disposed on the operation panel, and the detection target includes a human body.

5. The information processing device according to claim 1, further comprising a storage device, wherein when the controller changes the current state from the one of the second standby state and the third standby state to the first standby state upon the sensor detecting the detection target in the one of the second standby state and the third standby state, the storage device stores history information indicating the one of the second standby state and the third standby state, and when the timer measures the non-operation duration running for the third period starting from the state change to the first standby state according to the result of detection of the sensor, the controller changes the current state from the first standby state to the one of the second standby state and the third standby state based on the history information and the result of detection by the sensor.

* * * * *